Sept. 3, 1946.　　　A. KUTSCHA　　　2,406,780

PROFILING MILLING CUTTER

Filed April 22, 1943

INVENTOR
Alois Kutscha
BY
Parkinson & Lane
Attys.

Witness:

Patented Sept. 3, 1946

2,406,780

UNITED STATES PATENT OFFICE 2,406,780

PROFILING MILLING CUTTER

Alois Kutscha, Chicago, Ill.

Application April 22, 1943, Serial No. 484,016

5 Claims. (Cl. 29—105)

The present invention relates to a milling cutter assembly having a plurality of spaced arms each adapted to carry a cutting blade or bit for milling profiles, etc. Each blade or bit is mounted in position to mill longitudinally and radially of the axis of the cutter head to thereby most effectively mill profiles or to recess a casting or other work.

The invention further comprehends a novel means and manner of adjusting each cutter bit or blade within its mounting to assure optimum cutting effect and to insure or permit most effective use of the bits or blades and for a maximum period. It will be readily appreciated from the illustrative embodiment of cutter head herein disclosed that the spaced arms or projections are so constructed and arranged as to effect a considerable saving in metal over prior types of heads, and that the novel construction of cutter bits or blades is such as to also allow for an appreciable saving in the high grade tool steel necessary for their cutting edges or surfaces. For example, the body of each bit or blade may be of a relatively cheap metal with only the cutting edges of a high grade tool steel.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
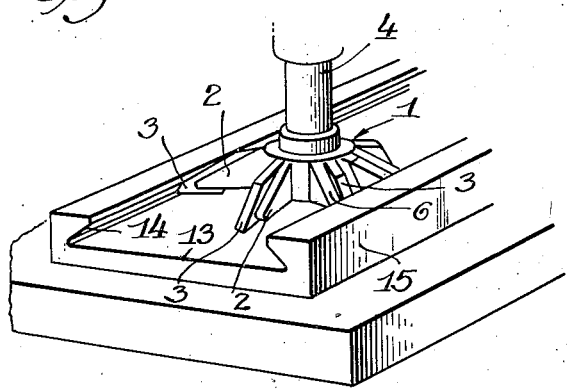
Figure 1 is a view in perspective of the novel cutter assembly shown in position for milling and profiling a recess in an object or casting.

Referring more particularly to the embodiment selected to illustrate the invention, the novel milling cutter assembly is shown at 1 and provided with a plurality of spaced projections 2 providing a novel support and mounting for a plurality of cutter bits or blades 3. The assembly is shown as mounted upon and rotatable from a vertically arranged shaft 4 driven from any suitable source of power. Each projection is slotted or recessed at one side thereof at 5 for the reception of one of the cutting bits or blades 3 and with the outer surface of this projection which may be preferably tapered at 6 and provided with three openings 7 suitably spaced apart and arranged in triangular formation for the reception of locking bolts 8 carried in similarly arranged recesses or openings in a locking plate 9. Each cutter bit or blade is preferably provided with five openings 10 with three of these openings spaced in the same manner as the openings in the locking plate 9 and projection 2 for the reception of the locking bolts and whereby each bit or blade is rigidly anchored and locked in position for operation upon a casting or other work.

Figure 6:
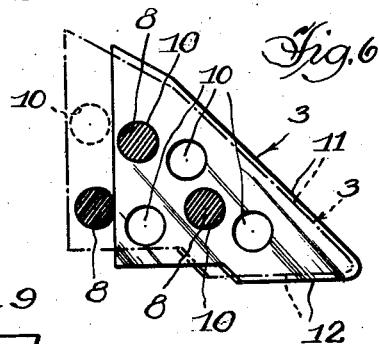
Figure 6 is a view showing in front elevation an illustrative embodiment of a cutter bit or blade, the initial position of this cutter blade or bit and the novel manner of mounting it being shown in dotted outline, and subsequently adjusted position of the blade being shown in full outline.

As shown in Figure 6, each blade may be of substantially triangular shape and provided with cutting edges or surfaces 11 and 12 whereby to mill a profile such as in the surface 13 and under-cut 14 of a casting or other object 15 upon which the milling cutter is operating. Due to the fact that the cutting bit or blade is of a high grade steel, it is highly important that it be employed to its maximum efficiency. This is contemplated and the present invention permits the surfaces 11 and 12 to be sharpened whenever that becomes necessary.

Figure 4:
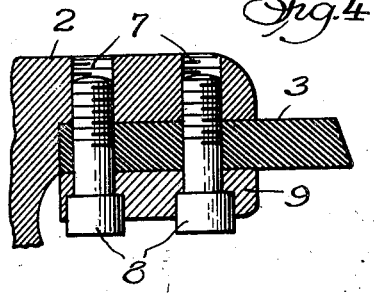
Figure 4 is an enlarged fragmentary view in horizontal cross-section through the mounting or support for a cutter blade or bit and taken on the line 4—4 of Figure 2.
Figure 5:
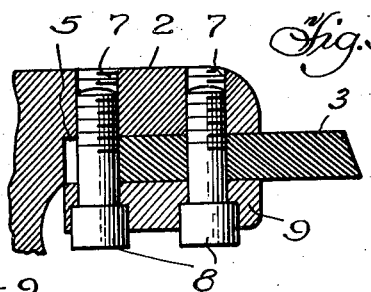
Figure 5 is a view similar to Figure 4 but showing the position of the cutter blade or bit within its mounting after it has become worn and resharpened.
Figure 3:
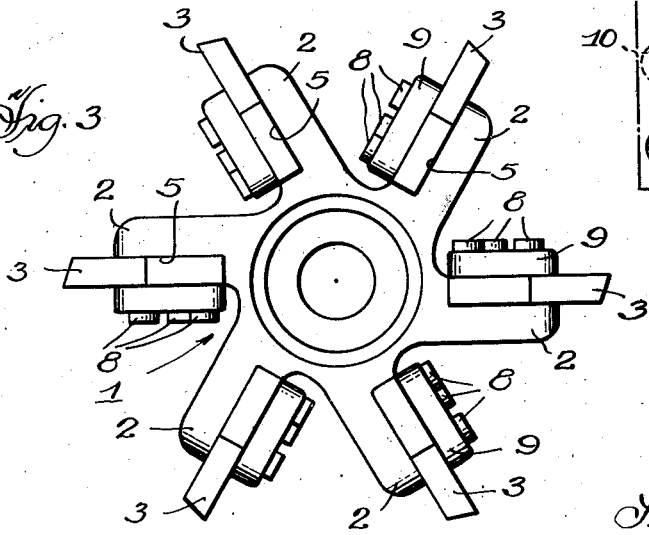
Figure 3 is a top plan view of the cutter head assembly.

As shown in Figure 4, when a new cutting blade 3 is inserted into the cutter head or holder with its inner edge abutting the shoulder or rearward abutment of the recess, the three locking bolts 8 project through the aligned openings 10 in the blade or bit 3 and lock this blade rigidly in position. Whenever the surfaces 11 and 12 become sufficiently worn, the blade may be removed and sharpened along surfaces substantially parallel with those of 11 and 12 and then again inserted into the holder as shown in Figure 5. At such time, the blade being of less dimensions than when new or initially applied, two of the locking bolts 8 in the plate 9 are projected through the other two openings 10 in the bit or blade and the third locking bolt 8 in the plate engages the rear surface or inner edge of the bit or blade and provides an abutment for preventing retraction and rigidly holding each bit or blade in position, as more clearly shown in Figure 5. Thus, the purpose of each of the five openings to allow for this dual adjustment, will be appreciated.

Figure 2:
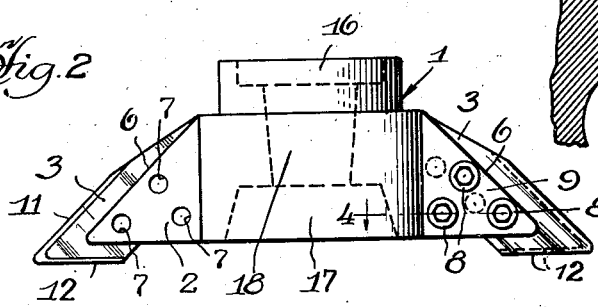
Figure 2 is a view in side elevation of the cutter head assembly but with several of the arms removed to more clearly show the manner of attaching the cutter tool or head to the shaft.

The cutter head or cutting tool may be mounted upon the shaft 4 by any suitable means. As shown in Figure 2, the upper and lower surface of the head may be recessed or counterbored at 16 and 17, respectively, and provided with a tapered opening 18 for receiving the reduced end of the shaft. The recess 16 is adapted to receive a collar or enlargement on the shaft and the recess or counterbore 17 receive a lock nut or other means for locking the head to the threaded, reduced end of the shaft 4.

It will be readily appreciated that the cutter head is so designed and constructed that the bits or blades need not be of the shape or contour or purpose of the bits or blades 3 as therein shown, but other forms of bit, blades or tools with or without fittings or adapters, may be interchangeable therewith for the purpose desired, such for example as end cutters or milling blades, etc.

Having thus disclosed my invention, I claim:

1. A cutting tool for a milling machine comprising a cutter head having a plurality of outwardly extending projections, one side of each projection being recessed for the reception of a cutting bit and provided with a shoulder, a cutting bit mounted within the recess and having substantially the shape of a right-angle triangle with the base and hypotenuse provided with cutting edges and the other side seating against the shoulder, a plate for anchoring and retaining the cutting bit within the recess and projection, spaced locking bolts carried by the plate and received in spaced aligned openings in the cutting bit and projection, and other openings provided in the cutting bit to be aligned with and receive certain of the locking bolts for permitting the bit to be adjusted to another position when the initial cutting surfaces thereof become worn, one of the locking bolts providing an abutment against which the rear of the bit seats when in the latter adjusted position.

2. A cutting tool for a machine for milling profiles comprising a cutter head having spaced outwardly extending projections each to mount a cutting bit, one side of each projection recessed for a greater portion of its length and provided with a shoulder, a cutting bit having substantially the shape of a right angle triangle with the base and hypotenuse provided with milling surfaces and its other side abutting against the shoulder, a retaining plate substantially conforming to the shape of the recess and provided with a plurality of spaced locking bolts passing through aligned openings in the bit and anchored in aligned openings in the projection, and additional openings in the bit for receiving certain of the locking bolts and mounting the bit outwardly of its initial position and in which position one of the bolts provides an abutment for the rear edge of the blade.

3. A cutting tool for a machine for milling profiles comprising a cutter head having spaced outwardly extending projections each to mount a cutting bit, one side of each projection recessed for a greater portion of its length and provided with a shoulder, a cutting bit having two of its edges exposed for milling purposes and another edge abutting against the shoulder, a retaining plate for anchoring and retaining the cutting bit within the recess and projection and against the shoulder, spaced locking bolts carried by the plate and received in spaced aligned openings in the cutting bit and projection, and other openings provided in the cutting bit to be aligned with and receive certain of the locking bolts for permitting the bit to be adjusted to another position away from the shoulder when the initial cutting surfaces thereof become worn, and means providing an abutment for the rear of the bit in this latter position.

4. A cutting tool for a machine for milling profiles in a metal casting comprising a cutter head having spaced outwardly extending projections each to mount a cutting bit, one side of each projection recessed for a greater portion of its length and provided with a shoulder, a cutting bit mounted in the recess and having its cutting surface exposed and the rear edge of the bit abutting the shoulder to prevent inward movement of the bit, a removable retaining plate substantially conforming to the shape of the recess and provided with spaced locking bolts arranged in triangular formation and carried in the retaining plate and to be received in aligned openings in the bit and projection for rigidly locking the bit against shifting from its predetermined position.

5. A milling cutter assembly for milling profiles, comprising a cutter head having a plurality of spaced projections, one side of each of the projections being recessed axially and provided with a shoulder, a cutting blade of substantially triangular formation to be received in each recess and provided with milling surfaces at two of its sides and with its other side abutting the shoulder, a plate for retaining each blade in position, locking members carried in each plate and projecting through aligned openings in each blade and received in aligned threaded openings in each arm, additional openings provided in each blade and spaced from the first mentioned openings for anchoring the blade in another position to permit the blades to be re-sharpened and reused, and an abutment against which the rear of the blade abuts in this latter position.

ALOIS KUTSCHA.